US005381188A

United States Patent [19]

Konno et al.

[11] Patent Number: 5,381,188

[45] Date of Patent: Jan. 10, 1995

[54] LIGHT TO LIGHT MODULATOR WITH READING LIGHT OF SPECIFIED WAVELENGTH

[75] Inventors: Toshio Konno, Hoya; Shintaro Nakagaki, Miura; Ichiro Negishi; Tetsuji Suzuki, both of Yokosuka; Fujiko Tatsumi, Yokohama; Ryusaku Takahashi; Keiichi Maeno, both of Yokosuka, all of Japan

[73] Assignee: Victor Company of Japan, Ltd., Yokohama, Japan

[21] Appl. No.: 878,046

[22] Filed: May 4, 1992

[30] Foreign Application Priority Data

May 8, 1991 [JP] Japan .................................. 3-132007

[51] Int. Cl.[6] .............................................. H04N 5/74

[52] U.S. Cl. ...................................................... 348/766

[58] Field of Search ................. 358/60, 231, 233, 236, 358/61; H04N 5/73; 348/766

[56] References Cited

U.S. PATENT DOCUMENTS 3,971,931 7/1976 Jehle .

4,150,396 4/1979 Hareng et al. ......................... 358/60

4,945,423 7/1990 Takanashi et al. ............. 358/233 X

OTHER PUBLICATIONS

"Video-Rate Liquid-Crystal Light-Valve Using an Amorphous Silicon Photoconductor" from the SID 90 Digest, pp. 327–329.

U.S. Ser. No. 702,817.

Xerox Disclosure Journal vol. 1, No. 11, 1976, Stamford, Conn., entitled "Optical Display".

IBM Technical Disclosure Bulletin vol. 19, No. 6, New York, N.Y. pp. 2266–2267, entitled "Photoconductor Liquid Crystal Cell".

*Primary Examiner*—Mark R. Powell

*Attorney, Agent, or Firm*—Michael N. Meller

[57] ABSTRACT

The present invention offers a display system for displaying information comprising a linear array of N light-emitting devices emitting light of predetermined wavelength, the devices are arranged respectively with N pixels, a stream of the information is divided into pieces each of which containing the N pixels, and the N light-emitting devices are caused to emit N light beams simultaneously in a form of array during a given period for every divided piece of the information, the every divided piece of information may correspond to one line of a frame of picture, the N light beams are intensity-modulated respectively with the divided piece of the information, the N light beams are deflected simultaneously in a direction perpendicular to a direction of the array of the N light beams, and a spatial light modulator having a photoconductive layer and a light modulation layer interposed between a pair of electrodes, the photoconductive layer is responsive to the deflected N light beams incident thereto through a focusing lens as a writing light, and a reading light of visible wavelength which is shorter than the predetermined wavelength of the emitted light from the linear array of the N light-emitting devices, the reading light irradiates the photomodulation layer of the spatial light modulator to read out and display the written information thereon.

3 Claims, 3 Drawing Sheets

LIGHT TO LIGHT MODULATOR WITH READING LIGHT OF SPECIFIED WAVELENGTH

BACKGROUND OF THE INVENTION

1. Field of the Invention

The present invention relates to a display system and, more particularly, to a display system including a spatial light modulator (SLM).

2. Description of the Related Art

A display system has been known in which a light beam whose intensity is modulated with a signal of information, is projected onto a screen by a optical projector system to display a two-dimensional image of the information. In this respect, a conventional system utilizes an optical beam whose intensity is modulated according to pixel data of the image carried by an image signal, and the optical beam scans a display screen vertically and horizontally. With these prior art techniques, it has been impossible to form a two-dimensional high-definition optical image with high brightness such as a two-dimensional image consisting of 4000×4000 pixels substantially on a real-time basis, because a signal conversion device satisfying this requirement has been unavailable.

In an attempt to solve the foregoing problem, the present Applicant has proposed an improved system as described in Japanese patent application No. 337171/1989 corresponding to U.S. patent application Ser. No. 633,223, now U.S. Pat. No. 5,185,617. In particular, a light source projects light rays of a rectilinear cross section onto a linear light modulator, in which the incident light rays are intensity-modulated correspondingly with pixels of information aligned in the linear light modulator, in turn, the intensity modulated light rays leave the light modulator as a light beam of a rectilinear cross section. The outgoing beam is deflected horizontally at a given frequency by a rotating polygon mirror and projected onto a screen via a projector lens to create a two-dimensional image. The aforementioned problem is solved by this conventional system. This improved system makes it easy to display a high-definition image with high brightness.

However, the system proposed by the present Applicant as described above has a disadvantage that the intensity modulation of light in the light modulator according to the pixels of information, is slow in response. To solve the problem of this slow response, the present Applicant has proposed another display system as described in Japanese patent application No. 130498/1990 corresponding to U.S. patent application Set. No. 702,817. Specifically, a stream of information to be displayed as a two dimensional image, is divided into plural pieces. A linear array of light-emitting devices is arranged to have N light-emitting devices corresponding to N pixels contained in each divided piece of the stream of information. During a given period, the N light-emitting devices are driven with each divided piece of information as such that signals of N pixels in each divided piece of the information are concurrently supplied to their respective N light-emitting devices to light up them simultaneously and according to each divided piece of information. Light rays emitted from the array of light-emitting devices are concurrently deflected in a direction perpendicular to the direction of the array of the light rays. These deflected light rays impinges as writing light onto a spatial light modulator comprising at least a photoconductive layer and a light modulation layer interposed between electrodes. The writing light is focused onto the photoconductive layer. Reading light is arranged to impinge the spatial light modulator to project the image information read from the modulator onto a screen.

If the reading light used to read the information from the spatial light modulator leaks into the photoconductive layer of the modulator on which the reading light impinges, then the contrast ratio deteriorates. However, it is impossible to design the modulator so that the leakage of the reading light is completely eliminated. Where a bright and good quality image is desired to be displayed on the display system of this construction, an intense reading light in the visible region must be directed to the spatial light modulator. In this case, the amount of the reading light leaking into the photoconductive layer of the modulator increases. As a result, it is inevitable that the contrast of the displayed image reduces. When a high resolution and high quality image writing is desired under such condition that a large amount of reading light leaks into the photoconductive layer of the modulator as described above, one of the conceivable methods is using an intense light beam of a small diameter as the writing light. However, it is difficult to produce such writing light from light-emitting devices forming an array.

SUMMARY OF THE INVENTION

The present invention offers a display system for displaying information comprising a linear array of N light-emitting devices emitting light of predetermined wavelength, the devices are arranged respectively with N pixels, a stream of the information is divided into pieces each of which containing the N pixels, and the N light-emitting devices are caused to emit N light beams simultaneously in a form of array during a given period for every divided piece of the information, the every divided piece of information may correspond to one line of a frame of picture, the N light beams are intensity-modulated respectively with the divided piece of the information, the N light beams are deflected simultaneously in a direction perpendicular to a direction of the array of the N light beams, and a spatial light modulator having a photoconductive layer and a light modulation layer interposed between a pair of electrodes, the photoconductive layer is responsive to the deflected N light beams incident thereto through a focusing lens as a writing light, and comprising a reading light of visible wavelength which is shorter than the predetermined wavelength of the emitted light from the linear array of the N light-emitting devices, the reading light irradiates the photomodulation layer of the spatial light modulator to read out and display the written information thereon.

The photomodulation layer may be comprised of homeotropically oriented liquid crystal having an electric field-controlled birefringence.

Other objects and features of the invention will become obvious upon an understanding of the illustrative embodiment about to be described or will be indicated in the appended claims, and various advantages not referred to herein will occur to one skilled in the art upon employment of the invention in practice.

DETAILED DESCRIPTION OF THE PREFERRED EMBODIMENT

Figure 1:
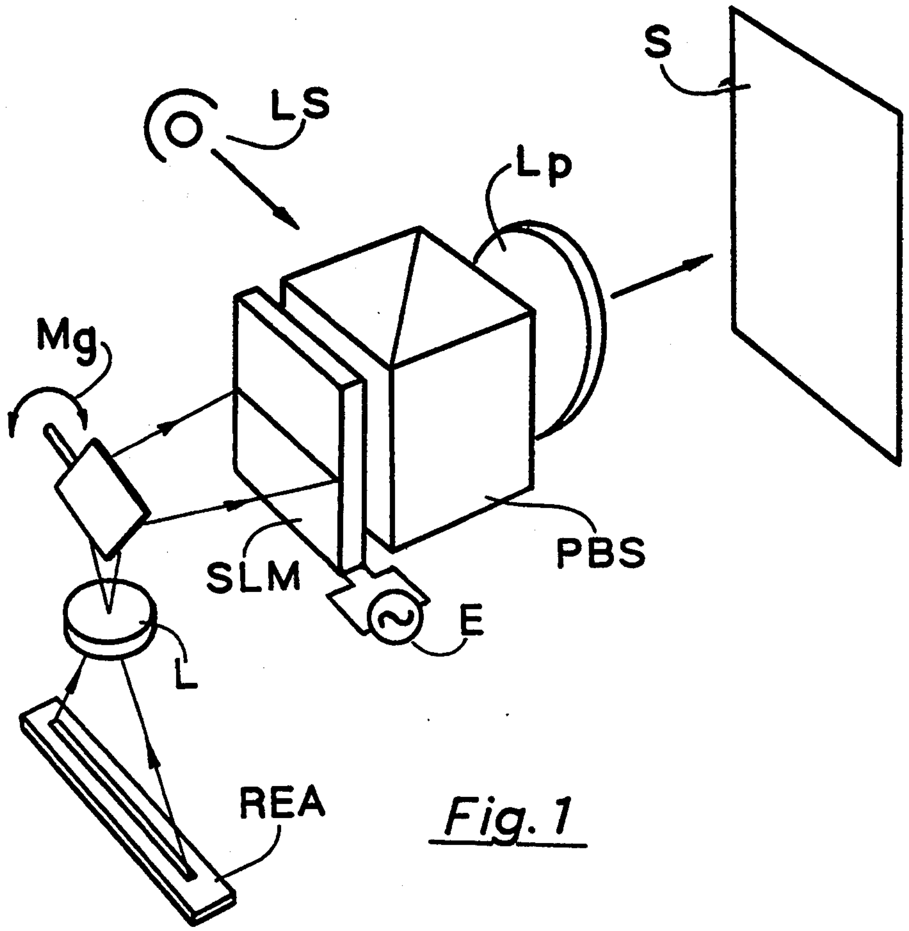
FIG. 1 is a perspective view of a display system according to the present invention.
Figure 3:
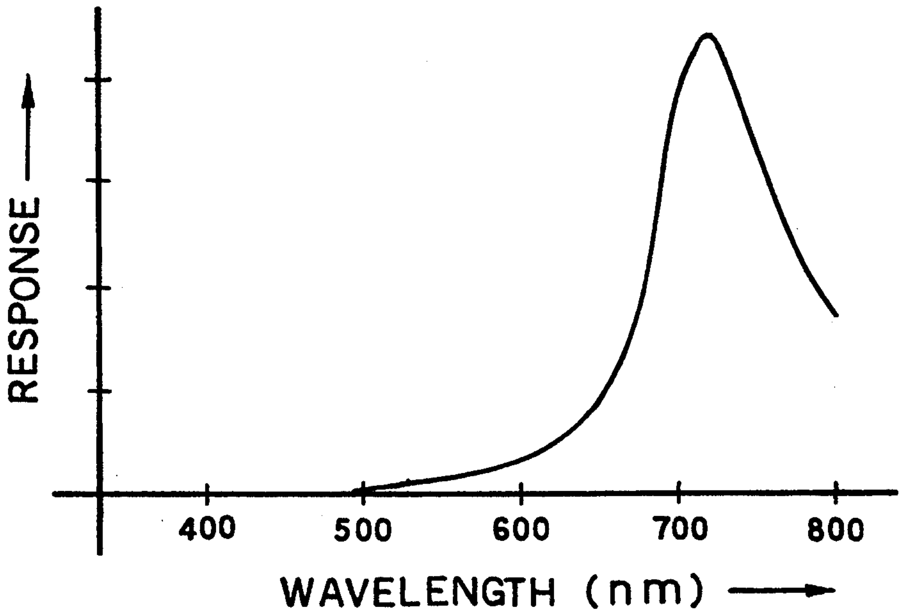
FIG. 3 is a graph showing the spectral sensitivity characteristic curve of the photoconductive material used in the display system shown in FIG. 1.

Referring to FIG. 1, there is shown a display system according to present the invention. This system includes a linear array REA having N light-emitting devices in line corresponding to N pixels fed to drive thereof. N is a natural number equal to or greater than 2. The linear array REA may be comprised of light-emitting diodes, semiconductor lasers, or the like on a substrate. Alternatively, the linear array REA may be an array of light-emitting devices with microlenses thereon. The linear array REA of the light-emitting devices emits writing light to spatial light modulator SLM having a photoconductive layer PCL (described later). Referring to FIG. 3, the wavelength of the writing light is so selected that it falls into a proximity of the peak of the spectral sensitivity of the photoconductive layer PCL. The intensity of the writing light of N light rays is distributed along the linear array of the N light emitting devices correspondingly with N pixels which constitute one line of the image to be displayed. The N light-emitting devices of the N light rays are driven to lit up simultaneously for a given period which may be equivalent to one scanning line period for a frame of picture in a conventional image scanning system. For example, when the image information to be displayed is in a form of image signal in a time domain being supplied to the display system from an image information source, the image signal is divided into a plurality of segments each of which contains N pixels and corresponds to each of the divided pieces of the image information, and each segment (piece of the information) is converted to simultaneously presenting signals at a rate of every piece of the information by a series-to-parallel converter such as shift register.

The intensity-modulated N light rays emitted from the N light-emitting devices of the linear array REA are directed onto an optical deflector or scanner such as a galvano-mirror Mg or revolving polygon mirror via a lens L. The mirror Mg vibrates in the direction indicated by the double headed arrow at a predetermined rate. The light rays deflected by the vibrating mirror Mg scans across a surface of the spatial light modulator SLM from its top to bottom at a scanning speed corresponding to the predetermined rate of the mirror vibration. The deflected light rays are focused as writing light onto the photoconductive layer of the light modulator SLM to write the image information thereon.

The N light-emitting devices of the linear array REA are caused to emit light rays as such that they are intensity-modulated according to the information of N pixels aligned in one straight line across the image to be displayed. Similar operations are successively performed of plurality of such straight lines forming the image to be displayed. In this way, the image to be displayed is written to the spatial light modulator SLM.

Figure 2:
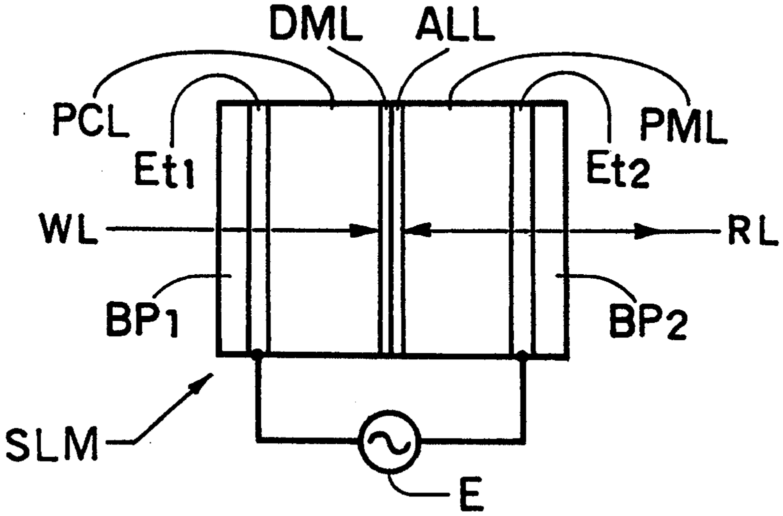
FIG. 2 is a side elevation in cross section of the spatial light modulator of the display system shown in FIG. 1.

The spatial light modulator SLM used in the display system shown in FIG. 1 can be fabricated by laminating a transparent substrate $BP_1$, a transparent electrode $Et_1$, a photoconductive layer PCL, a dielectric mirror DML, an orientation film ALL, a light modulation layer PML, a transparent electrode $Et_2$, and a transparent substrate $BP_2$ interfacing each other in this order as shown in FIG. 2. The spatial light modulator SLM can be either of a light reflection type or a light transmission type. In the following description, the reflection type spatial light modulator is used as the spatial light modulator SLM.

The structure and the operation of the above described spatial light modulator SLM are described by referring to FIG. 2. Each of the transparent electrodes $Et_1$ and $Et_2$ of the modulator SLM consists of a thin transparent electro-conductive material. The photoconductive layer PCL exhibits photoconductivity responsive in the wavelength range of the writing light. In the present example, the photoconductive layer PCL is made of hydrogenated amorphous silicon (a−Si=H) whose spectral sensitivity characteristic curve is shown in FIG. 3. The vertical axis of FIG. 3 represents the ratio of the impedance Zd of the photoconductive layer PCL when no light is incident on it to the impedance Zp of the photoconductive layer PCL when light is incident on it, i.e., Zd/Zp.

The dielectric mirror DML can take a well-known form such as a multilayer film reflecting a light in the predetermined wavelength range. The light modulation layer PML is made of a light-modulating material which varies or modulates the mode of the light transmitted therethrough in response to the strength of the applied electric field. In the present example, this layer PML is made of a homeotropically oriented liquid crystal exhibiting birefringence controlled by the applied electric field. The orientation film ALL shown in FIG. 2 is for orienting the liquid crystal homeotropically. A voltage supply E applies a predetermined voltage between the transparent electrodes $Et_1$ and $Et_2$.

Referring still to FIG. 2, the writing light WL enters the substrate $BP_1$ and is focused onto the photoconductive layer PCL causing the electrical resistance of the photoconductive layer PCL to reduce in response to the intensity of the writing light WL. This resistance reduction takes place two dimensionally over the surface of the photoconductive layer PCL as the surface is scanned with the writing light.

As a result, a charge image is formed on the interface between the photoconductive layer PCL and the dielectric mirror DML. Electric potential distribution of the charge image corresponds to the amount of writing light of N light rays which scan the photoconductive layer PCL, where the N light rays are intensity modulated with the image information line by line to cove one full frame of the image to be displayed. Accordingly, the photomodulation layer PML is two dimensionally subjected to an electric field generated by the charge image.

It should be noted that the wavelength of the writing light WL is selected to be in the proximity of the peak of the spectral sensitivity the photoconductive layer PCL, which peak in this embodiment is slightly over 700 nm, which is in the near infrared region as shown in FIG. 3.

Figure 4:
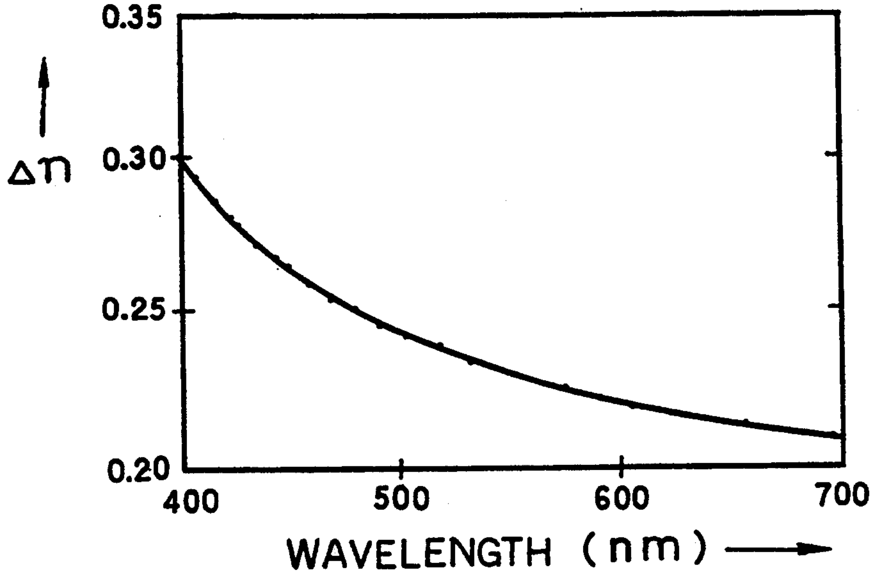
FIG. 4 is a graph showing the dependence of the index of double refraction of electro-optical crystals and liquid crystals on the wavelength.
Figure 5:
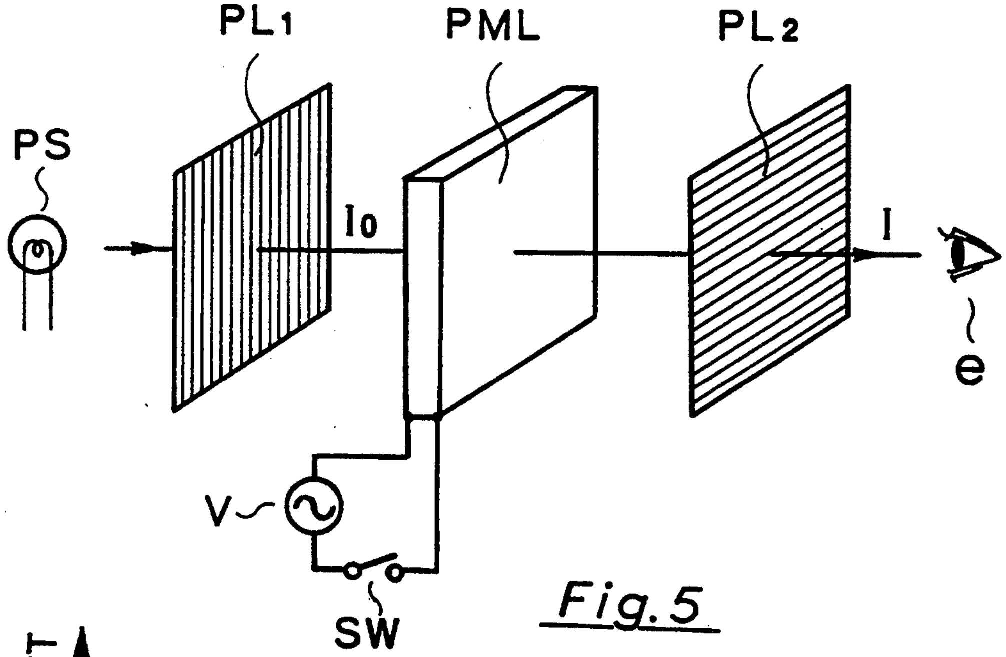
FIG. 5 is a view showing the arrangement of optical members used to illustrate the intensity of light transmitted through the light modulation layer of the spatial light modulator shown in FIG. 1.

FIG. 4 shows dependence of the index of double refraction $\Delta n$ of crystals or liquid crystals showing electro-optical effects on the wavelength of light. As can be seen from this graph, the index of double refraction $\Delta n$ varies depending on the wavelength of the light. Referring to FIG. 5, the light modulation layer PML made of a nematic liquid-crystal cell, for example, is positioned between two polarizers $PL_1$ and $PL_2$ whose principal planes are perpendicular to each other in the crossed Nicol's relation. V is a driving voltage and SW indicates a switch to apply the driving voltage and SW indicates a switch to apply the driving voltage. When the light emitted from a light source PS is passed through the polarizer $PL_1$ and the light modulation layer, the intensity I of the transmitted light is given by:

$$I=I_o \sin^2(\pi R/\lambda) \quad (1)$$

where R is a retardation given by:

$$R=d\,\Delta n \cos^2\phi(V) \quad (2)$$

The factor $\phi(V)$ included in equation (2) is the tilt angle of the major axis of the average molecule of the liquid crystal. Light having a wavelength $\lambda p$ is transmitted to the greatest extent under the condition of:

$$R=m\lambda p+\lambda p/2 \quad (3)$$

where m is the order of interference pattern, and m=0, 1, 2, 3 . . . . Under this condition, some orders m are determined from equation (4) given below:

$$\cos^2\phi(V)=\{(m\lambda p+\lambda p/2)/\Delta n(\lambda p)d\}\leqq 1 \quad (4)$$

Figure 6:
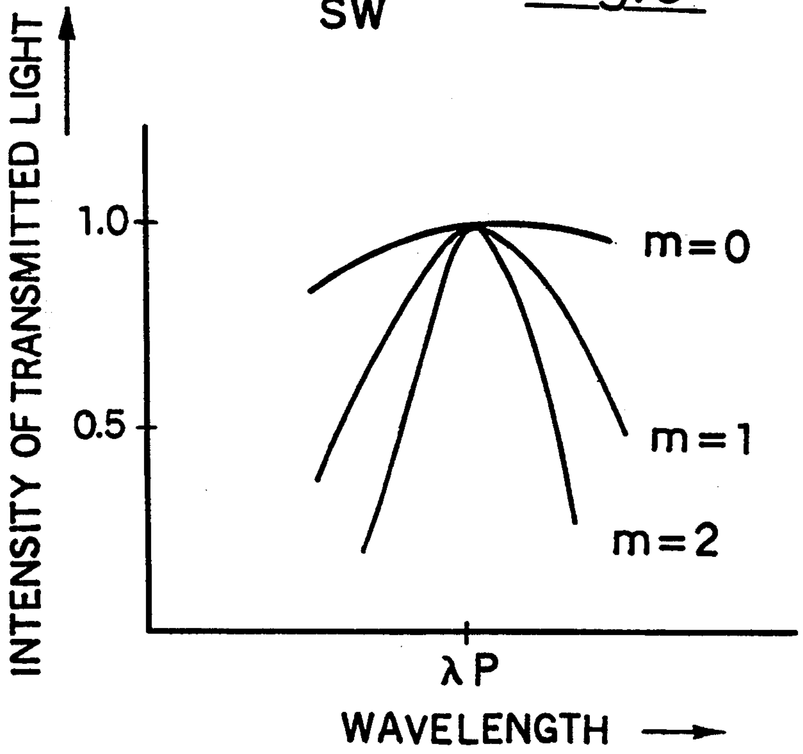
FIG. 6 is a graph in which the intensity of the light transmitted through the light modulation layer shown in FIG. 5 is plotted against the wavelength.

A driving voltage $V_P$ which maximizes the intensity of the light of the wavelength $\lambda p$ is found from equation (4). When a light having a range of wavelengths is incident to the light modulation layer PML shown in FIG. 5 under the driving voltage $V_P$ is applied the layer, the intensity of the transmitted light reduces sharply as the order m increases as shown in FIG. 6.

On the other hand, the conventional homogeneously oriented liquid crystal is driven generally with a large value of the order m, thus the intensity of the transmitted light varies greatly with its wavelength. Therefore, where a homogeneously oriented liquid crystal is employed as the light modulation layer PML, the intensity of the transmitted light varies greatly with the wavelength of the reading light. Consequently, it is inevitable that the contrast ratio deteriorates. Meanwhile, the homeotropically oriented liquid crystal used in the present invention is used generally at a small value of the order m. Therefore, the intensity of the transmitted light is less affected by the wavelength value.

Thus, the present invention using the homeotropically oriented liquid crystal presents a high contrast ratio.

In FIG. 1, the reading light RL is produced by a light source LS. The reading light RL is in the visible range and does not include wavelength components to which the photoconductive layer PCL of the spatial light modulator SLM is sensitive. When such sensitive wavelength for the photoconductive layer PCL is in the proximity of 700 nm as shown in FIG. 3, the light in the wavelength range from 420 nm to 630 nm is preferable for reading light RL for color image displays, such preferable wavelength range is utilized on the present invention unlike the writing light WL which scans the spatial light modulator SLM, the reading light RL is a signal beam of light which irradiates the modulator SLM simultaneously as follows.

When the reading light RL emitted from the light source LS enters a polarizing beam splitter PBS, the "S" polarized component of the reading light RL is reflected toward the reading side of the spatial light modulator SLM by the beam splitter PBS and enters the transparent substrate $BP_2$ of the modulator SLM. The reading light RL then passes through the transparent electrode $Et_2$, the light modulation layer PML comprising the homeotropically oriented liquid crystal, the orientation film ALL, and the dielectric mirror DML where the reading light RL is reflected back by the dielectric mirror DML to the orientation film ALL, passing again the light modulation layer PML, the transparent electrode $Et_2$, and the transparent substrate $BP_2$. The reading light RL then exits out the spatial light modulator SLM.

From the foregoing description, it can be understood that the reading light RL passed through twice the photomodulation layer PML undergoing the electric field produced by the electric charge image, is polarization modulated correspondingly with pixels of the image information written on the photoconductive layer PCL.

The polarization modulated reading light RL enters the polarization beam splitter PBS. As a result "P" polarized component of the reading light RL passes through the polarization beam splitter PBS, is projected on the screen S by the projection lens $L_P$. In the description made thus far, the spatial light modulator SLM is of the reflection type. The inventive display system can also use a transmission type spatial light modulator.

As described in detail thus far, the N light-emitting devices of the linear array REA emit N light rays which are intensity-modulated according to the image information to be projected on displayed, and such writing light rays are focused onto the spatial light modulator SLM. These N light rays from one straight line of N light spots on the spatial light modulator at a time. And this straight line of N light spots concurrently scans the modulator SLM to write the information. Whereas in the prior art display system, a single beam of light is intensity-modulated with a signal carrying image information to be displayed.

The modulated signal beam of light scans the spatial light modulator SLM sequentially by being deflected in vertical and horizontal directions to write the image information.

By comparison, for a given pixel on the spatial light modulator SLM, the time of exposure to the writing light is N times longer in the present invention than that in the prior art. This enables the present invention system to use a low intensity light spot, thus the writing light leakage into the photoconductive layer PML is minimized.

Therefore, information can be written to the spatial light modulation SLM with high quality and accuracy. Further, high sensitivity information writing is performed because the wavelength of the writing light is selected to be in the proximity of the peak of the spectral sensitivity characteristic curve of the photoconductive layer PCL of the modulator SLM.

When the photomodulation layer PML of the spatial light modulator SLM is made of a homeotropically oriented liquid crystal exhibiting electric field-controlled birefringence which is less dependent on wavelength, for example, a wide range of wavelength, e.g., from 420 nm to 630 nm in the visible region in which the photoconductive layer PCL is responsive, can be effectively utilized as the reading light RL.

Consequently, the display system of the present invention features a displayed image of bright, high resolution and high contrast ratio by utilizing a white reading light quite efficiency.

What is claimed is:

1. A display system for displaying information comprising:

a linear array of N light-emitting devices emitting light of a predetermined wavelength range, the N light-emitting devices being arranged correspondingly with N pixels, a stream of the information being divided into pieces each of which containing the N pixels;

means for causing the N light-emitting devices to simultaneously emit N light beams in a form of array during a given period for every piece of the information, the N light beams being intensity-modulated respectively with a divided piece of the information;

deflecting means for deflecting the N light beams simultaneously in a direction perpendicular to a direction of the array of the N light beams;

a spatial light modulator comprising a photomodulation layer, a photoconductor layer and a dielectric mirror directly provided on the photoconductive layer which photomodulation layer, photoconductive layer and dielectric layer are interposed between two electrodes, the photoconductive layer being made of a photoconductive material that sensitively responds substantially to an incidental light having said predetermined wavelength range of the light emitted from the linear array of the N light-emitting devices;

focusing means which focuses the N light beams deflected by said deflecting means as writing light onto the photoconductive layer of a spatial light modulator; and means for irradiating the photomodulation layer of the spatial light modulator with a reading light for reading out and displaying information written on the spatial light modulators, said reading light having a visible wavelength range excluding said predetermined wavelength range, wherein wavelengths contained in said visible wavelength range are shorter than wavelengths contained in said predetermined wavelength range of the light emitted from the linear array of the N light-emitting devices.

2. The display system of claim 1, wherein the light modulation layer of the spatial light modulator comprises a homeotropically oriented liquid crystal having an electrically controlled birefringence effect.

3. A display system for displaying information as claimed in claim 1, wherein said focusing means is disposed between said linear array of N light-emitting devices and said deflecting means.

* * * * *